United States Patent
Han et al.

(10) Patent No.: US 8,265,356 B2
(45) Date of Patent: Sep. 11, 2012

(54) METHOD AND APPARATUS FOR EFFICIENT AUTOMATED RE-CONTOURING OF FOUR-DIMENSIONAL MEDICAL IMAGERY USING SURFACE DISPLACEMENT FIELDS

(75) Inventors: Xiao Han, Chesterfield, MO (US); Lyndon S. Hibbard, St. Louis, MO (US); Ryan Scott Brame, Chesterfield, MO (US)

(73) Assignee: Computerized Medical Systems, Inc., St. Louis, MO (US)

( * ) Notice: Subject to any disclaimer, the term of this patent is extended or adjusted under 35 U.S.C. 154(b) by 1171 days.

(21) Appl. No.: 12/022,929

(22) Filed: Jan. 30, 2008

(65) Prior Publication Data

US 2009/0190809 A1 Jul. 30, 2009

(51) Int. Cl.
*G06K 9/34* (2006.01)
(52) U.S. Cl. ......... 382/128; 382/130; 382/131; 382/132
(58) Field of Classification Search .................. 382/128, 382/130, 131, 132, 173, 175, 181
See application file for complete search history.

(56) References Cited

U.S. PATENT DOCUMENTS

| | | | |
|---|---|---|---|
| 6,142,019 A | | 11/2000 | Venchiarutti et al. |
| 6,259,943 B1 * | | 7/2001 | Cosman et al. ............... 600/429 |
| 6,343,936 B1 | | 2/2002 | Kaufman et al. |
| 6,606,091 B2 | | 8/2003 | Liang et al. |
| 6,683,933 B2 | | 1/2004 | Saito et al. |
| 6,947,584 B1 | | 9/2005 | Avila et al. |
| 7,010,164 B2 | | 3/2006 | Weese et al. |
| 7,110,583 B2 | | 9/2006 | Yamauchi |
| 7,167,172 B2 | | 1/2007 | Kaus et al. |
| 7,333,644 B2 | | 2/2008 | Jerebko et al. |
| 2006/0147114 A1 | | 7/2006 | Kaus et al. |
| 2006/0149511 A1 | | 7/2006 | Kaus et al. |
| 2006/0159322 A1 | | 7/2006 | Rinck et al. |
| 2006/0159341 A1 | | 7/2006 | Pekar et al. |
| 2006/0204040 A1 * | | 9/2006 | Freeman et al. ............... 382/107 |
| 2007/0014462 A1 | | 1/2007 | Rousson et al. |
| 2007/0041639 A1 | | 2/2007 | Von Berg et al. |
| 2007/0092115 A1 * | | 4/2007 | Usher et al. .................... 382/117 |
| 2007/0167699 A1 * | | 7/2007 | Lathuiliere et al. ........... 600/407 |
| 2009/0016612 A1 * | | 1/2009 | Lobregt et al. ................. 382/199 |
| 2009/0060299 A1 | | 3/2009 | Hibbard et al. |

OTHER PUBLICATIONS

Adelson et al., "Pyramid Methods in Image Processing", RCA Engineer, Nov./Dec. 1984, pp. 33-41, vol. 29-6.
Bertalmio et al., "Morphing Active Countours", IEEE Trans. Patt. Anal. Machine Intell., 2000, pp. 733-737, vol. 22.

(Continued)

*Primary Examiner* — David A Vanore
*Assistant Examiner* — Nicole Ippolito
(74) *Attorney, Agent, or Firm* — Thompson Coburn LLP

(57) ABSTRACT

A technique is disclosed for generating a new contour and/or a 3D surface from contour data using a surface displacement field. The technique is preferably applied to un-contoured target images within a 4D image sequence for which contour data is desired. The technique can be initialized with contour data related to a reference image that has already been contoured, e.g. by a doctor who manually enters contour information into a computer. Image registration (calculation of correspondence between the reference image and target image) can be performed simultaneously with segmentation (identifying regions of interest in the target image). This allows one to make use of segmentation information in a reference image to improve the accuracy of contouring within the target image.

70 Claims, 13 Drawing Sheets

OTHER PUBLICATIONS

Burnett et al., "A Deformable-Model Approach to Semi-Automatic Segmentation of CT Images Demonstrated by Application to the Spinal Canal", Med. Phys., Feb. 2004, pp. 251-263, vol. 31 (2).

Cover et al., Elements of Information Theory, Chapter 2, 1991, Wiley, New York, 33 pages.

Cover et al., Elements of Information Theory, Chapter 8, 1991, Wiley, New York, 17 pages.

Davis et al., "Automatic Segmentation of Intra-Treatment CT Images for Adaptive Radiation Therapy of the Prostate", presented at 8th Int. Conf. MICCAI 2005, Palm Springs, CA, pp. 442-450.

Freedman et al., "Active Contours for Tracking Distributions", IEEE Trans. Imag. Proc., Apr. 2004, pp. 518-526, vol. 13 (4).

Gao et al., "A Deformable Image Registration Method to Handle Distended Rectums in Prostate Cancer Radiotherapy", Med. Phys., Sep. 2006, pp. 3304-3312, vol. 33 (9).

Han et al., "A Morphing Active Surface Model for Automatic Re-Contouring in 4D Radiotherapy", Proc. of SPIE, 2007, vol. 6512, 9 pages.

Jain et al., "Deformable Template Models: A Review", Signal Proc., 1998, pp. 109-129, vol. 71.

Jehan-Besson et al., "Shape Gradients for Histogram Segmentation Using Active Contours", 2003, presented at the 9th IEEE Int. Conf. Comput. Vision, Nice, France, 8 pages.

Kalet et al., "The Use of Medical Images in Planning and Delivery of Radiation Therapy", J. Am. Med. Inf. Assoc., Sep./Oct. 1997, pp. 327-339, vol. 4 (5).

Leymarie et al., "Tracking Deformable Objects in the Plane Using an Active Contour Model", IEEE Trans. Patt. Anal. Machine Intell., Jun. 1993, pp. 617-634, vol. 15 (6).

Lorensen et al., "Marching Cubes: A High Resolution 3D Surface Construction Algorithm", Computer Graphics, Jul. 1987, pp. 163-169, vol. 21 (4).

Lu et al., "Automatic Re-Contouring in 4D Radiotherapy", Phys. Med. Biol., 2006, pp. 1077-1099, vol. 51.

Lu et al., "Fast Free-Form Deformable Registration Via Calculus of Variations", Phys. Med. Biol., 2004, pp. 3067-3087, vol. 49.

Marker et al., "Contour-Based Surface Reconstruction Using Implicit Curve Fitting, and Distance Field Filtering and Interpolation", The Eurographics Association, 2006, 9 pages.

Paragios et al., "Geodesic Active Contours and Level Sets for the Detection and Tracking of Moving Objects", IEEE Trans. Patt. Anal. Machine Intell., Mar. 2000, pp. 266-280, vol. 22 (3).

Pekar et al., "Automated Model-Based Organ Delineation for Radiotherapy Planning in Prostate Region", Int. J. Radiation Oncology Biol. Phys., 2004, pp. 973-980, vol. 60 (3 ).

Pentland et al., "Closed-Form Solutions for Physically Based Shape Modeling and Recognition", IEEE Trans. Patt. Anal. Machine Intell., Jul. 1991, pp. 715-729, vol. 13 (7).

Rogelj et al., "Symmetric Image Registration", Med. Imag. Anal., 2006, pp. 484-493, vol. 10.

Sarrut et al., "Simulation of Four-Dimensional CT Images from Deformable Registration Between Inhale and Exhale Breath-Hold CT Scans", Med. Phys., Mar. 2006, pp. 605-617, vol. 33 (3).

Schroeder et al., The Visualization Toolkit, 2nd edition, chapters 5 & 13, 65 pages (Part 1).

Schroeder et al., The Visualization Toolkit, 2nd edition, chapters 5 & 13, 65 pages (Part 2).

Sethian, "Level Set Methods and Fast Marching Methods", 2nd ed., 1999, Cambridge University Press, Chapters 1, 2 & 6, 39 pages.

Stefanescu, "Parallel Nonlinear Registration of Medical Images With a Priori Information on Anatomy and Pathology", PhD Thesis. Sophia-Antipolis: University of Nice, 2005, Cover Sheet through pp. 43 (Part 1).

Stefanescu, "Parallel Nonlinear Registration of Medical Images With a Priori Information on Anatomy and Pathology", PhD Thesis. Sophia-Antipolis: University of Nice, 2005, pp. 44-93 (Part 2).

Stefanescu, "Parallel Nonlinear Registration of Medical Images With a Priori Information on Anatomy and Pathology", PhD Thesis. Sophia-Antipolis: University of Nice, 2005, pp. 94-133(Part 3).

Stefanescu, "Parallel Nonlinear Registration of Medical Images With a Priori Information on Anatomy and Pathology", PhD Thesis. Sophia-Antipolis: University of Nice, 2005, pp. 94-133(Part 4).

Strang, "Introduction to Applied Mathematics", 1986, Wellesley, MA: Wellesley-Cambridge Press, pp. 242-262.

Thirion, "Image Matching as a Diffusion Process: An Analog with Maxwell's Demons", Med. Imag. Anal., 1998, pp. 243-260, vol. 2 (3).

Vemuri et al., "Joint Image Registration and Segmentation", Geometric Level Set Methods in Imaging, Vision, and Graphics, S. Osher and N. Paragios, Editors, 2003, Springer-Verlag, New York, pp. 251-269.

Wang et al., "Validation of an Accelerated 'Demons' Algorithm for Deformable Image Registration in Radiation Therapy", Phys. Med. Biol., 2005, pp. 2887-2905, vol. 50.

Xing et al., "Overview of Image-Guided Radiation Therapy", Med. Dosimetry, 2006, pp. 91-112, vol. 31 (2).

Xu et al., "Image Segmentation Using Deformable Models", Handbook of Medical Imaging, vol. 2, M. Sonka and J. M. Fitzpatrick, Editors, 2000, SPIE Press, Chapter 3.

Yezzi et al., "A Variational Framework for Integrating Segmentation and Registration Through Active Contours", Med. Imag. Anal., 2003, pp. 171-185, vol. 7.

Young et al., "Registration-Based Morphing of Active Contours for Segmentation of CT Scans", Mathematical Biosciences and Engineering, Jan. 2005, pp. 79-96, vol. 2 (1).

Zagrodsky et al., "Registration-Assisted Segmentation of Real-Time 3-D Echocardiographic Data Using Deformable Models", IEEE Trans. Med. Imag., Sep. 2005, pp. 1089-1099, vol. 24 (9).

Zhong et al., "Object Tracking Using Deformable Templates", IEEE Trans. Patt. Anal. Machine Intell., May 2000, pp. 544-549, vol. 22 (5).

Anderson et al., "LAPACK User's Guide", Third Edition, SIAM—Society for Industrial and Applied Mathematics, 1999, Philadelphia.

Barrett et al., "Interactive Live-Wire Boundary Extraction", Medical Image Analysis, 1, 331-341, 1997.

Bloomenthal, "An Implicit Surface Polygonizer", Graphics Gems IV, P Heckbert, Ed., Academic Press, New York, 1994.

Carr et al., "Reconstruction and Representation of 3D Objects with Radial Basis Functions", Proceedings of SIGGRAPH 01, pp. 67-76, 2001.

Carr et al., "Surface Interpolation with Radial Basis Functions for Medical Imaging", IEEE Transactions on Medical Imaging, 16, 96-107, 1997.

DeBoor, "A Practical Guide to Splines", Springer, New York, 2001.

Digital Imaging and Communications in Medicine (DICOM), http://medical.nema.org/.

Dinh et al., "Reconstructing Surfaces by Volumetric Regularization Using Radial Basis Functions", IEEE Trans. Patt. Anal. Mach. Intell., 24, 1358-1371, 2002.

Dinh et al., "Texture Transfer During Shape Transformation", ACM Transactions on Graphics, 24, 289-310, 2005.

DoCarmo, "Differential Geometry of Curves and Surfaces", Prentice Hall, New Jersey, 1976.

Falcao et al., "An Ultra-Fast User-Steered Image Segmentation Paradigm: Live Wire on the Fly", IEEE Transactions on Medical Imaging, 19, 55-62, 2000.

Gering et al., "An Integrated Visualization System for Surgical Planning and Guidance Using Image Fusion and an Open MR", Journal of Magnetic Resonance Imaging, 13, 967-975, 2001.

Gering, "A System for Surgical Planning and Guidance Using Image Fusion and Interventional MR", MS Thesis, MIT, 1999 (part 1).

Gering, "A System for Surgical Planning and Guidance Using Image Fusion and Interventional MR", MS Thesis, MIT, 1999 (part 2).

Golub et al., "Matrix Computations", Third Edition, The Johns Hopkins University Press, Baltimore, 1996.

Ho et al., "SNAP: A Software Package for User-Guided Geodesic Snake Segmentation", Technical Report, UNC Chapel Hill, Apr. 2003.

Huang et al., "Semi-Automated CT Segmentation Using Optic Flow and Fourier Interpolation Techniques", Computer Methods and Programs in Biomedicine, 84, 124-134, 2006.

Igarashi et al., "Smooth Meshes for Sketch-based Freeform Modeling" In ACM Symposium on Interactive 3D Graphics, (ACM I3D'03), pp. 139-142, 2003.

Igarashi et al., "Teddy: A Sketching Interface for 3D Freeform Design", Proceedings of SIGGRAPH 1999, 409-416.

Ijiri et al., "Seamless Integration of Initial Sketching and Subsequent Detail Editing in Flower Modeling", Eurographics 2006, 25, 617-624, 2006.

Jain, "Fundamentals of Digital Image Processing", Prentice-Hall, New Jersey, 1989.

Karpenko et al., "Free-Form Sketching with Variational Implicit Surfaces", Computer Graphics Forum, 21, 585-594, 2002.

Karpenko et al., "SmoothSketch: 3D Free-Form Shapes From Complex Sketches", Proceedings of SIGGRAPH 06, pp. 589-598.

Lipson et al., "Conceptual Design and Analysis by Sketching", Journal of AI in Design and Manufacturing, 14, 391-401, 2000.

Piegl et al., "The NURBS Book", Second Edition, Springer, New York, 1997 (part 1).

Piegl et al., "The NURBS Book", Second Edition, Springer, New York, 1997 (part 2).

Press et al., "Numerical Recipes in C", Second Edition, Cambridge University Press, 1992.

Schmidt et al., ShapeShop: Sketch-Based Solid Modeling with Blob Trees, EUROGRAPHICS Workshop on Sketch-Based Interfaces and Modeling, 2005.

Thomas, "Numerical Partial Differential Equations: Finite Difference Methods", Springer, New York, 1995.

Turk et al., "Shape Transformation Using Variational Implicit Functions", Proceedings of SIGGRAPH 99, Annual Conference Series, (Los Angeles, California), pp. 335-342, Aug. 1999.

Wahba, "Spline Models for Observational Data", SIAM (Society for Industrial and Applied Mathematics), Philadelphia, PA, 1990.

Wolf et al., "ROPES: A Semiautomated Segmentation Method for Accelerated Analysis of Three-Dimensional Echocardiographic Data", IEEE Transactions on Medical Imaging, 21, 1091-1104, 2002.

Yoo, "Anatomic Modeling from Unstructured Samples Using Variational Implicit Surfaces", Proceedings of Medicine Meets Virtual Reality 2001, 594-600.

Yushkevich et al., "User-Guided 3D Active Contour Segmentation of Anatomical Structures: Significantly Improved Efficiency and Reliability", NeuroImage 31, 1116-1128, 2006.

Zeleznik et al., "SKETCH: An Interface for Sketching 3D Scenes", Proceedings of SIGGRAPH 96, 163-170, 1996.

* cited by examiner

1. Initialize $\mathbf{u}^0 = \mathbf{0}$, generate the reference and target image pyramids and a multi-resolution representation of the reference surface.
2. for each resolution level
3.    for $n = 1, \ldots,$ max_number_of_iterations, do
4.       for each surface vertex $(r, s)$, do
5.          Calculate gradients $\mathbf{F}_1$, $\mathbf{F}_2$, and $\mathbf{F}_3$ according to Eqs. (5), (6), and (7) respectively
6.          Update $\mathbf{u}^{n+1} = \mathbf{u}^n - \Delta t(\mathbf{F}_1 + w_1 \mathbf{F}_2 + w_2 \mathbf{F}_3)$
7.       end vertex loop
8.       Check convergence criteria
9.    end iteration loop
10. If not at the finest level, interpolate the displacement field to the next surface resolution to get $\mathbf{u}^0$ for the next resolution level. Otherwise, set $\mathbf{u}_{opt} = \mathbf{u}^n$.
11. end all levels
12. Compute the target surface $\mathbf{x} = \mathbf{x}_0 + \mathbf{u}_{opt}$

Figure 6

METHOD AND APPARATUS FOR EFFICIENT AUTOMATED RE-CONTOURING OF FOUR-DIMENSIONAL MEDICAL IMAGERY USING SURFACE DISPLACEMENT FIELDS

FIELD OF THE INVENTION

The present invention pertains generally to the field of processing medical images, particularly generating contours for four-dimensional (4D) medical imagery.

BACKGROUND AND SUMMARY OF THE INVENTION

"Contouring" refers to identifying and delineating objects or structures in images by way of contours corresponding to such objects/structures. Contouring is an important part of radiation therapy planning (RTP), wherein treatment plans are custom-designed for each patient's anatomy. Contours are often obtained "manually" in response to user input, wherein a user traces the object boundary on the image using a computer workstation's mouse and screen cursor. Contours can also be obtained via automated processes such as auto-thresholding programs and/or auto-segmentation programs. The process of delineating or "contouring" structures within an image is known in the field as "image segmentation."

With the recent advent of "4D radiotherapy" or "adaptive radiotherapy", the need for increased automation processes to generate contours for 3D medical images has grown greater. Four-dimensional (4D) and adaptive radiotherapy techniques were developed recently as an effort to improve the accuracy of dose deposition in the presence of organ and/or tumor motion, and also in situations where the organ and/or tumor change shape over the course of treatment. Instead of using a single 3D image for treatment planning, 4D radiotherapy planning uses a time-series of 3D images to model the motion and/or shape-change of structures. Consequently, the number of images involved in 4D radiotherapy is much greater than the number of images required for 3D radiotherapy.

Because structures shown in images are preferably identified in a computer-readable way to be useful for radiotherapy treatment, it is desirable that many 3D images be contoured. Due to the large number of images involved in 4D radiotherapy, manual contouring of these images is extremely tedious and time-consuming. Consequently, there is a strong need in the art for increased automation in the contouring of 3D medical images.

Several methods have been proposed, but these methods suffer from the drawbacks of long processing times and/or inaccurate contouring results. In an effort to solve these problems in the art, an exemplary embodiment of the present invention is configured to provide robust and accurate contouring results while also providing short processing times due to improved computational efficiency. This is achieved using a hybrid image registration and segmentation technique, as disclosed below.

In an exemplary embodiment of the present invention, a program is configured to generate 3D contours for a series of related target images with respect to an object of interest based on an initial reference image for which the object of interest has already been contoured. Preferably, the reference image has been contoured manually (for example, by a doctor using known software for manual input of contour data into a computer), but this need not be the case. When a segmentation technique relies on a manually-contoured reference image, it may be referred to as a "semi-automated" or "automatic re-contouring" method.

In addition to the contouring information which delineates the object of interest, it is desirable to know the correspondence between images in a series. Image registration is the process of determining the correspondence of points between two images collected at different times or using different imaging modalities. Image registration data, when combined with contouring data, provides valuable information about how structures such as an object of interest have moved or changed shape over time.

Current image processing software programs known to the inventors herein are believed to perform image registration and segmentation separately. In an exemplary embodiment, the inventors disclose an innovative technique for the automatic re-contouring of images based on simultaneous image registration and segmentation. By making use of pre-existing contouring data for the reference image, it is possible to provide improved accuracy in contouring the target image(s). Moreover, due to improved computational efficiency, an embodiment of the present invention is able to provide this improved accuracy while also providing shorter processing times.

When contouring a plurality of time-series images, it is believed that conventional contour-generating software ignores the contouring information available from computing the contouring information for one of these images when computing the image registration and segmentation of another image in the series. By taking into account the contouring information available with respect to the reference image, the inventors believe that the accuracy of re-contouring results can be improved.

In an embodiment of the present invention, the contouring information for the reference image is used as a starting point for an automated re-contouring process. Computer software can be used to calculate a surface displacement field. The surface displacement field defines the correspondence between points on the contour surface in the reference image and points on the new contour surface in the target image. The surface displacement field provides both the correspondence between the reference image and the target image (registration) and the location of objects of interest within the target image (segmentation). Therefore, it can be said that the calculation of the surface displacement field achieves a simultaneous image registration and segmentation. This surface displacement field preferably defines a vector field which can be used to map the contoured structures in the reference image onto the target image. Preferably, one surface displacement field is calculated for each object of interest in the reference image. The surface displacement field approach yields many advantages, as will be apparent from the detailed description below.

In an exemplary embodiment of the present invention, the surface displacement field is only computed at points of the already-delineated object boundaries in the reference image. Current contour-generating software is believed to redundantly compute the correspondence map for every point in the reference image during registrations. By computing the surface displacement field only at points on the already-delineated object boundaries, this embodiment achieves improved computational efficiency and shorter processing time. Thus, the inventors believe that traditional 4D re-contouring approaches use deformable image registration techniques which are formulated to answer the question: "What is the best match (in the target image) for every point in the reference image?" Instead, a preferred embodiment disclosed herein seeks to answer the question: "What is the best match (in the target image) for every point on the surface of the object desired to be found in the target image?" In providing an answer to this question, the preferred embodiment is believed to greatly enhance computational efficiency. While a preferred solution to the inventors' question as disclosed herein involves consideration of more points than just the object surface points from the reference contour (for example, an exemplary embodiment considers all points inside the object surface for histogram matching and also considers points in a neighborhood of the object surface for an image gradient computation), the inventors note that the total number of points considered with such processing will still only be a small part of the whole image; this is particularly true when contouring small objects such as a tumor.

In yet another exemplary embodiment of the present invention, a multi-resolution implementation is disclosed. In this embodiment, the surface displacement field is computed at multiple resolutions of each target image. First, the reference and target images are down-sampled to a coarse resolution. The surface displacement field is then calculated for this coarse resolution. Preferably, this "coarse-level" surface displacement field is used as the starting point for the surface displacement field calculation at the next finer resolution. Preferably, this process is repeated for a plurality of resolutions (e.g., three resolutions corresponding to coarse, medium, and fine (original) resolutions). By computing the surface displacement field at lower resolutions in this manner, the present invention is able to better capture large deformations in objects of interest.

While various advantages and features of several embodiments of the invention have been discussed above, a greater understanding of the invention including a fuller description of its other advantages and features may be attained by referring to the drawings and the detailed description of the preferred embodiment which follow.

BRIEF DESCRIPTION OF THE DRAWINGS

FIG. 6 shows a pseudo-code implementation for a multi-resolution morphing active surface model algorithm according to an exemplary embodiment of the present invention.

DETAILED DESCRIPTION OF THE PREFERRED EMBODIMENTS

I. Contours:

Contours are planar, closed curves $C(x,y,z)$ which can be realized as sets of non-uniformly sampled points along the user-input stroke, $\{c_1, \ldots, c_M\}$ (or sets of points generated by an auto-thresholding and/or auto-segmentation program), wherein the individual points are represented by $c_i=C(x_i,y_i,z_i)$, and wherein M is the number of points in the contour. Points $c_i$ in the T planes (xz-planes) have y constant, S contours (yz-planes) have x constant, and C contours (xy-planes) have z constant.

Contours can also be parameterized by a curve length u where the curve C of length L is represented as $C(x,y,z)=C(x(u),y(u),z(u))=C(u)$ where $0 \leq u \leq L$ and $C(0)=C(L)$.

Figure 1:
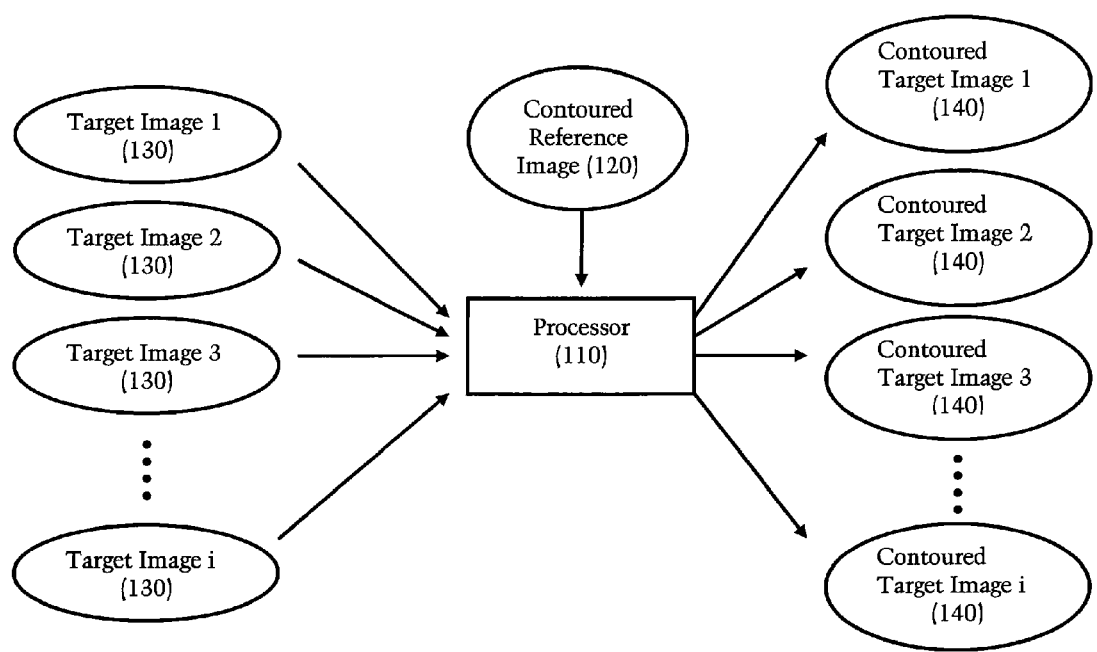
FIG. 1 depicts a basic overview of the inputs and outputs of at exemplary embodiment of the present invention.

FIG. 1 depicts a basic overview of the inputs and outputs for an exemplary embodiment of the present invention. The inputs preferably comprise (a) a reference image 120 for which contour data is available (for example, reference image 120 has been manually contoured by a doctor using known manual contouring software), and (b) a plurality of target images 130 for which registration and segmentation are desired. The reference image 120 and the target images 130 are preferably part of a 4D image sequence. Target images 130 are preferably in an ordinal-sequence as shown in FIG. 1 (e.g. Target Image, 1, 2, 3, . . . i). The target images 130 are also preferably numbered in chronological order. The reference image 120 and target images 130 are preferably computed tomography (CT) images, but other types of images can be used. Each image of the 4D image sequence is preferably a three-dimensional image, which is preferably stored in the Digital Imaging and Communications in Medicine (DICOM) format. DICOM is the industry standard for the transferral of radiologic images and other medical information between computers. The contour data associated with the reference image is also preferably stored in the DICOM format as DICOM structure set objects.

The stack of contours for each object, as usually stored in a DICOM structure set file, can be converted to a 3D surface mesh using existing methods. One example for such a conversion is the surface reconstruction method described by Marker. See J. Marker, I. Braude, K. Museth, D. Breen, "*Contour-Based Surface Reconstruction using Implicit Curve Fitting, and Distance Field Filtering and Interpolation,*" *Proceedings of International Workshop on Volume Graphics*, July 2006, pp. 95-102, the entire disclosure of which is incorporated by reference herein.

Optionally, the object segmentation for the reference image can also be provided directly as a surface file. One popular surface file format is the Visualization Toolkit (VTK) Polydata format, which is provided in conjunction with an open source computer graphics application available from Kitware, Inc. of Clifton Park New York. See The Visualization Toolkit, An Object-Oriented Approach To 3D Graphics, 3rd edition, the entire disclosure of which is incorporated by reference herein.

A processor 110 is configured to perform the automatic re-contouring of objects of interest (as delineated in the reference contouring data) to generate contour data for the target images, as described herein. Processor 110 can be any general purpose processor with sufficient computational resources, as would be understood by a person of ordinary skill in the art.

The output of the technique is preferably a contoured target image 140. Each contoured target image 140 preferably comprises the original target image data and the newly computed boundary surfaces for each object. It should be noted that the target image need not be re-saved because the DICOM format allows for the storage of sufficient information in the contour data file itself to point to the corresponding target image. The target image data and boundary surface data can optionally be stored in the same file, or in two or more related files, as is known in the art. It should also be noted that each object surface defined by the contour data can be directly saved in a surface file, for example, using the VTK polydata file format.

Preferably, each object surface is converted to a stack of two-dimensional contours using known techniques such as clipping. The two-dimensional contours are preferably stored in the DICOM structure set file format. Each DICOM structure set file, which pertains to a single image, can optionally store data related to contours for multiple objects. These DICOM files can then be exported to a treatment planning system for planning patient treatment. However, it should be noted that treatment planning systems in the future may also be able to directly use the three-dimensional object surface models, rather than the stack of two-dimensional contours, in which case the conversion from three-dimensions to two-dimensions would be unnecessary for importing contour data into a treatment planning system.

To carry out these tasks, processor 110 is preferably programmed with software as described herein. This software preferably operates on data that is loaded into computer memory accessible to the processor, such as RAM or other working memory which may be available. The software can be programmed using a wide variety of programming languages including, but not limited to, C, C++, Java, etc.

Figure 2A:
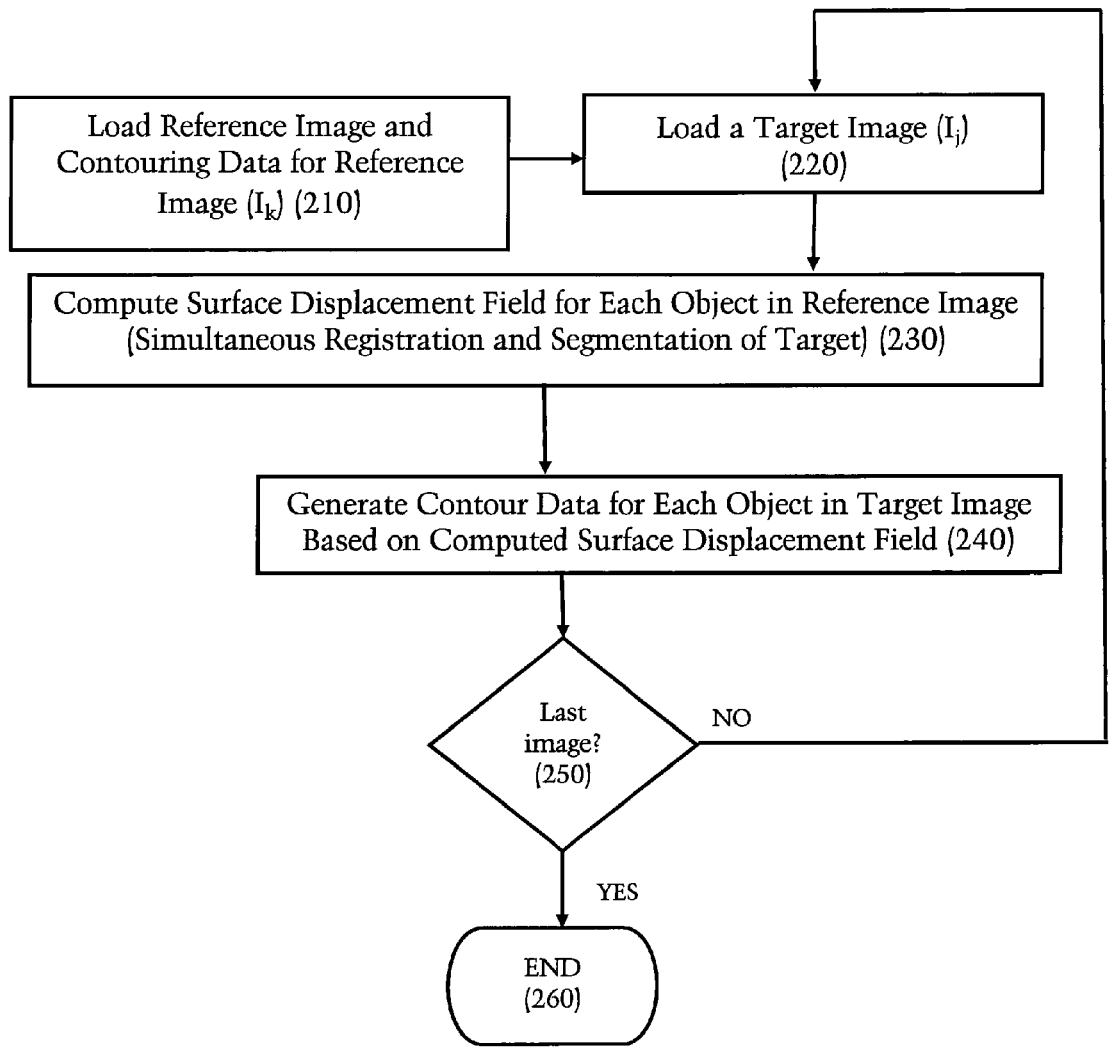
FIGS. 2(a) and (b) depict basic overviews of the program flow for exemplary embodiments of the present invention.
Figure 2B:
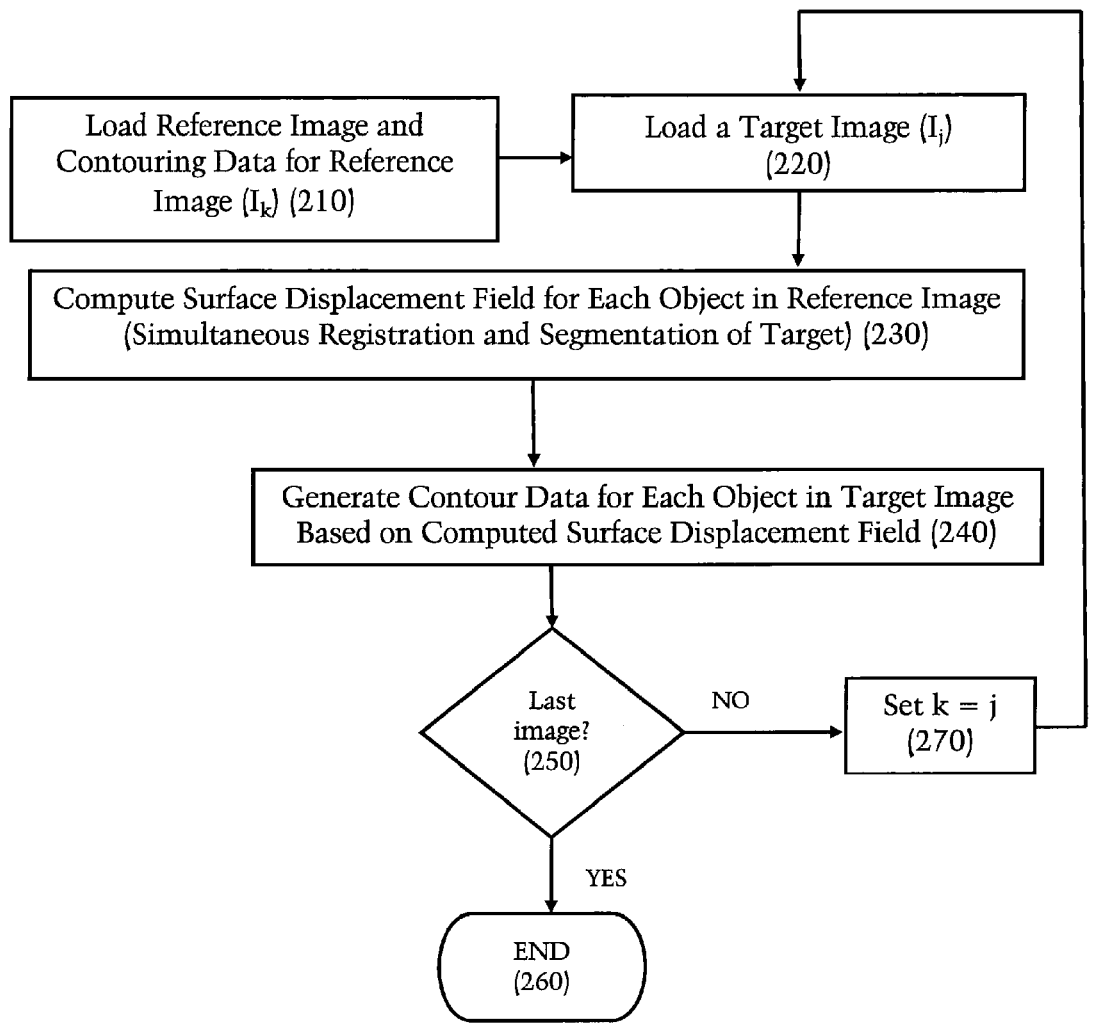

FIG. 2(*a*) depicts a basic overview of a program flow for the software executed by processor 110 in an exemplary embodiment of the present invention. The program first loads the input data including the reference image ($I_k$) and the contouring data for the reference image 120 into a computer memory at step 210. The variable "k" is preferably used to indicate the number of the image from the 4D sequence that is to be used as the reference image 120. At step 220 the program loads a first target image 130 ($I_j$) into a computer memory. The variable "j" is a loop variable that is changed (i.e. incremented) at each iteration of the loop such that "j" cycles through all of the images in the 4D sequence. At step 230 the program preferably computes a surface displacement field for each contoured object in the reference image. At step 240, the program preferably generates the contour data for each object in the target image based on the surface displacement field calculated at step 230. The generated contour data for contoured target image 140 is preferably stored in the DICOM format as described above. At step 250, the program determines whether the previous target image was the last target image of the series. If the previous image was the last target image of the series, the program continues to step 260, which is effectively the end of the program. If there are additional target images in the sequence, then the program continues to step 220 to load the next target image.

FIG. 2(*b*) shows a basic overview of an alternative embodiment. This embodiment is similar to the embodiment of FIG. 2(*a*), except that in this embodiment the target contour data generated at step 240 and the current target image are used in place of the original reference image and reference contour during the next iteration with the next target image. Thus, the contoured reference image 120 is initially used as the reference image, as in FIG. 2(*a*). At step 270, the program sets k=j, so that in the next iteration the contoured target image 140 will be used as the reference image ($I_k$) and the reference contour when contouring the next target image. This embodiment may be advantageous when the next target image is more similar to the previous target image than to the original reference image. Further, it will be appreciated by one of ordinary skill in the art that these two embodiments could be combined, such that the original reference image is sometimes used as the reference image, and a previously contoured target image is sometimes used as the reference image.

II. Mathematical Formulation:

This section describes the techniques used in the preferred embodiment to mathematically describe the problem of calculating an optimal surface displacement field at step 230 in FIG. 2. As described below, many permutations of such a calculation are possible.

Figure 3:
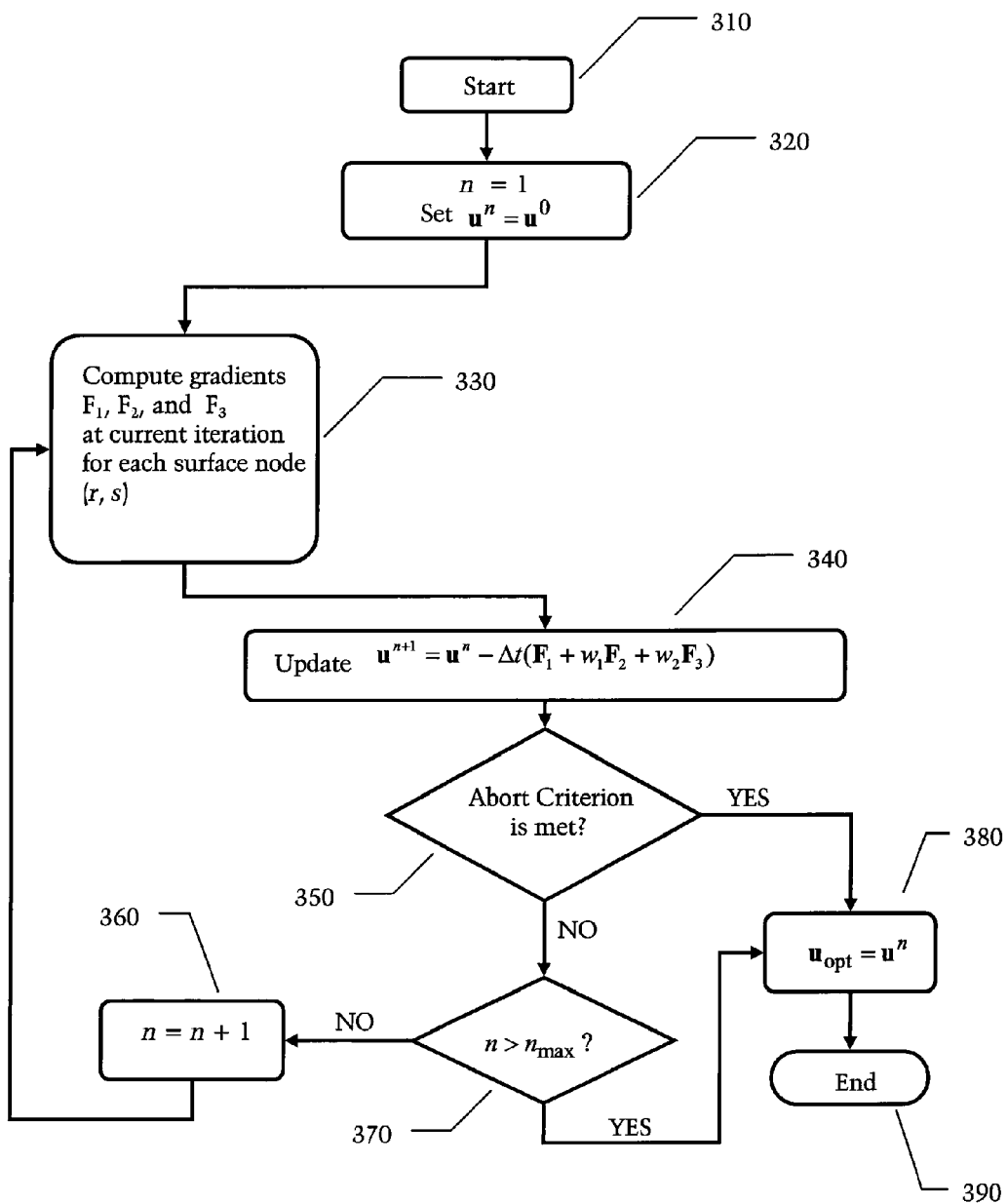
FIG. 3 depicts a flow diagram for the estimation of surface displacements (at a single resolution) in accordance with an exemplary embodiment of the present invention.

FIG. 3 depicts a flowchart for the estimation of surface displacements (for a single object, at a single resolution) in accordance with an exemplary embodiment of the present invention. The inputs to the process shown in FIG. 3 preferably include: a single reference image I, a single target image J, a reference object surface $x_0(r,s)$, an initial estimation of the surface displacement $u^0$, and user-selected values for weights $w_1$ and $w_2$. These inputs are preferably determined at or prior to step 310. The output of FIG. 3 is preferably an estimated optimal surface displacement field. The output of FIG. 3 may also include other representations of the segmentation of the target image and/or the registration between reference image I and target image J.

Turning now to a detailed description of the process of FIG. 3, let $I(x,y,z):R^3 \rightarrow R$ denote the reference image with the object of interest already segmented, and $J(x,y,z):R^3 \rightarrow R$ be the target image where automatic segmentation of the same object is desired. The segmented object is represented as a surface, where the boundary surface of the segmented object in the reference image can be represented by a vector-valued parametric function $x_0(r,s)=[x_0(r,s),y_0(r,s),z_0(r,s)]$. In this representation, the parameter pair (r,s) gives the surface coordinates of each surface point and $x_0(r,s)$ represents the position of the surface point in the image coordinate system. Given the object segmentation in reference image I, segmentation of the same object in target image J can be formulated as the problem of finding the new coordinates of each surface point (r,s) for the object of interest in image J. These new coordinates are denoted by another vector-valued function: $x(r,s)=[x(r,s),y(r,s),z(r,s)]$.

The value of Equation (1) is calculated as a result of steps 330, 340, 350, 360, 370, and 380 in FIG. 3. The surface displacement field $u(r,s)$ maps each point $x_0(r,s)$ of the reference surface to its new location $x(r,s)$ in the target image according to:

$$x(r,s)=x_0(r,s)+u(r,s), \forall (r,s).$$

Mathematically, one can formulate the problem of finding the optimal displacement field $u_{opt}$ as the solution to the following energy minimization problem:

$$u_{opt} = \operatorname*{argmin}_u(E(u)) = \operatorname*{argmin}_u \left( \frac{1}{2} \int\int \|I(x_0(r,s)) - J(x_0(r,s)+u(r,s))\|^2 dr ds + \frac{w_1}{2} \int\int \|\nabla u(r,s)\|^2 dr ds + w_2 E_{seg}(x) \right) \quad (1)$$

The energy functional E(u) in Equation (1) has three major terms, with weights $w_1$ and $w_2$ controlling the relative influence of each term. These weights can be user defined or provided as part of the application software. Preferably, by default $w_1=0.4$ and $w_2=0.2$. However, it should be understood that a practitioner may find other values for these weights useful.

The first energy term $$\frac{1}{2}\int\int \|I(x_0(r,s)) - J(x_0(r,s) + u(r,s))\|^2 dr ds$$

of Equation (1) is a registration term, which minimizes the sum of squared image intensity differences (SSD) at corresponding surface locations across the two images. This is a modified version of the Demons deformable image registration method. The underlying assumption is that the same anatomical point should have a constant intensity value across different images of a 4D sequence, and thus the image intensity can be used as a feature to establish the correspondences between points across the two images. This assumption holds well for CT images since the CT intensity value (Hounsfeld number) is an intrinsic measure of underlying tissue property. In this preferred embodiment, the summation of the intensity differences (computation of the registration term) is restricted to the object surface locations (instead of the whole image volume), although a preferred solution process involves visiting and using image information from a larger region, as explained above.

The second energy term $$\frac{w_1}{2}\int\int \|\nabla u(r,s)\|^2 dr ds$$

of Equation (1) is a regularization term where $\nabla u$ measures the gradient of the vector field u along the reference object surface $x_0$. This regularization term enforces coherent deformation of neighboring surface points and ensures physically more meaningful displacement fields. This term thereby constrains the surface displacement field to a smooth shape, making the generated contour more stable and less sensitive to image noise. A large value for weight $w_1$ encourages a constant displacement of all surface points and leads to more rigid-like transformations of the reference object surface. Optionally, a regularization of the target object surface x(r,s) (as in traditional deformable surface model methods) can also be added here as another energy term, wherein this term may take the form:

$$\int\int \alpha\left(\left|\frac{\partial x}{\partial r}\right|^2 + \left|\frac{\partial x}{\partial s}\right|^2\right) + \beta\left(\left|\frac{\partial^2 x}{\partial r^2}\right|^2 + 2\left|\frac{\partial^2 x}{\partial r \partial s}\right| + \left|\frac{\partial^2 x}{\partial s^2}\right|^2\right) dr ds,$$

wherein $\alpha$ and $\beta$ are two user-chosen weighting factors.

The third energy term $w_2 E_{seg}(X)$ of Equation (1) is an image segmentation term that is used to further constrain the final surface according to features of the target image. The inclusion of this term in Equation (1) is optional, and it can be omitted by setting $w_2=0$ or by leaving the image segmentation term out of Equation (1) altogether. Many energy functional designs from traditional active surface models can be used for $E_{seg}(x)$, such as the potential energy that attracts the surface to salient boundary locations. See C. Xu et al., "Medical image segmentation using deformable models", in Handbook of Medical Imaging, vol. 2, J. M. Fitzpatrick and M. Sonka, Eds.: SPIE Press, 2000, the entire disclosure of which is incorporated by reference herein. To fully exploit the correlation between the target and the reference images, the preferred embodiment employs a histogram matching-based segmentation criterion proposed by Jehan-Besson et al. and Freedman et al. See S. Jehan-Besson et al., "Shape gradient for histogram segmentation using active contours", 9th Int. Conf. Comput. Vision, Nice, France, 2003; and D. Freedman and T. Zhang, "Active contours for tracking distributions", IEEE Trans. Imag. Proc., vol. 13, pp. 518-526, 2004, the entire disclosures of which are incorporated by reference herein.

The segmentation energy functional $E_{seg}(x)$ can be defined as:

$$E_{seg}(x) = K(q_I(\cdot;x_0), p_J(\cdot;x)) = \int q_I(z;x_0)\log\left(\frac{q_I(z;x_0)}{p_J(z;x)}\right) dz \quad (2)$$

In Equation (2), $q_I(\cdot;x_0)$ and $p_J(\cdot;x)$ denote the image intensity probability density function within the object region of the reference and the target image respectively, and z denotes the image intensity value. K(q,p) is the Kullback-Leibler distance of the two probability density functions. The Kullback-Leibler distance (which may also be referred to as the Kullback-Leibler divergence) is a measure of the difference between two probability distributions. See Thomas M. Cover, Joy A. Thomas, Elements of information theory, New York: Wiley, 1991, the entire disclosure of which is incorporated by reference herein. Minimizing this energy functional encourages the object segmentation of the target image to have an intensity distribution that closely matches the distribution of the object region in the reference image. In the preferred embodiment, this energy functional complements the first registration term since it relies on regional properties of the whole object to be segmented while the registration term depends only on the surface point locations.

In an alternative embodiment, another choice for $E_{seg}(x)$ can be: $E_{seg}(x) = -\iint \|\nabla J(x)\|^2 dr ds$. Minimizing of this energy functional will drive the surface x towards locations in the target image J that have a large intensity gradient (usually, a large intensity gradient corresponds to object boundary locations).

III. Energy Minimization Solution:

This section describes the steps used in the preferred embodiment to calculate the solution to the energy minimization Equation (1). The solution to Equation (1) provides the optimal surface displacement field.

A gradient descent approach is preferably used to minimize the energy functional defined in Eq. (1) in order to find the optimal surface displacement field $u_{opt}$.

At step 320, the current displacement $u^n$ is initialized to $u^0$. Preferably $u^0=0$. At step 330, gradients $F_1$, $F_2$, and $F_3$ are calculated for each object surface node (r,s). $F_1$, $F_2$, and $F_3$ are the generalized gradients of the three energy terms in Equation (1) with respect to the unknown variable function u, which can be derived using standard techniques from the calculus of variations. See G. Strang, Introduction to applied mathematics. Wellesley, M A: Wellesley-Cambridge Press, 1986, the entire disclosure of which is incorporated by reference herein.

$F_1$ corresponds to the registration energy term and can be given by:

$$F_1(r,s) = -(I(x_0(r,s)) - J(x_0(r,s) + u^n(r,s)))\nabla J(x_0(r,s) + u^n(r,s)) \quad (3)$$

where $\nabla J$ is the gradient of the target image. Gradient $\nabla J$ can be computed using finite difference numerical schemes, as is known in the art. One can assume the image voxels are indexed by integer triplets (i, j, k). The x-component of the gradient can then be approximated by: $J_x(i,j,k)=0.5\times[J(i+1,j,k)-J(i-1,j,k)]/h_x$, where $h_x$ is the image spacing in the x-direction. The other two components of the gradient vector can be computed similarly. It should be noted that this formula only gives the value of $\nabla J$ at discrete image voxel locations. To find the value of $\nabla J$ at a surface point, one can either use the value at the closest voxel location or perform a trilinear interpolation using values of eight neighoring voxels that surround the surface point. The interpolation can be done for each component of the gradient separately.

$F_1$ as defined above has a limited capture range: it is equal to zero whenever $\nabla J$ is zero. This can be a problem at early iterations when the surface $x''(r,s)=x_0(r,s)+u''(r,s)$ is still far from the true target object boundary location and the registration gradient term will simply be zero for many surface points. Although the use of the segmentation energy partially addresses this problem and increases the capture range of the model, a preferred embodiment for step 330 modifies the registration gradient term to the following:

$$F_1(r,s)=-(I(x_0(r,s))-J(x_0(r,s)+u''(r,s)))(\nabla J(x_0(r,s)+u''(r,s))+\nabla I(x_0(r,s))) \quad (4)$$

In Equation (4), the gradient of the target image is replaced by the average gradient of both images at their corresponding locations. The extra term related to the gradient of the reference image can be considered as a "reverse force", imagining that one switches the role of the target and the reference images, as also proposed by Rogelj et al., Wang et al., and Thirion in a different context. See P. Rogelj and S. Kovacic, "Symmetric image registration", Med. Imag. Anal., vol. 10, pp. 484-493, 2006; H. Wang et al., "Validation of an accelerated 'demons' algorithm for deformable image registration in radiation therapy", Phys. Med. Biol., vol. 50, pp. 2887-2905, 2005; and J. Thirion, "Image matching as a diffusion process: an analog with Maxell's demons", Med. Imag. Anal., vol. 2, pp. 243-260, 1998, the entire disclosures of each of which are incorporated by reference herein. This modification addresses the capture range problem since $x_0(r,s)$ corresponds to the object boundary in the reference image and $\nabla I(x_0(r,s))$ is nonzero in general. In addition, this "symmetric" gradient force design also helps more accurate recovery of rotational components of the underlying deformation field. Preferably, Equation (4) is solved only for points that are object surface points in the reference image.

$F_2$ corresponds to the gradient of the regularization energy term, and is given by:

$$F_2(r,s)=-\Delta u''(r,s), \quad (5)$$

which is the negative Laplacian of the vector field $u''$ evaluated at an object surface node (r,s). It should be noted that this (surface-) Laplacian is defined on the domain of the surface parameterization but not on the spatial image coordinates. In practice, the surface model can be represented using triangular meshes, and the surface Laplacian of a scalar function evaluated at a surface mesh node can be well approximated by the average of the function values at all neighboring nodes minus the function value at the node itself. For a vector-valued function $u''$, the Laplacian is preferably evaluated for each of its components independently.

$F_3$ corresponds to the gradient of the histogram-matching based segmentation energy term and can be given by:

$$F_3(r,s) = \frac{1}{V(x''(r,s))}\left(1 - \frac{q_I(J(x''(r,s));x_0)}{p_J(J(x''(r,s));x'')}\right)N(r,s) \quad (6)$$

In Equation (6), $x''(r,s)=x_0(r,s)+u''(r,s)$ is the current estimate of the object boundary location in the target image J, V is the volume of the object region, and $N(r,s)$ is the outward normal vector of surface $x''(r,s)$ at the surface node (r,s), Intuitively, at a target object surface location $x''(r,s)$ where the intensity value is $z=J(x''(r,s))$, if the current target density $p_J(z;x'')$ is lower than the reference density $q_I(z;x_0)$, then the displacement field update ($-F_3(r,s)$) will be parallel to the surface outward normal direction, which effectively expands the target surface to enclose the point $x''(r,s)$. If $p_J(z;x'')$ is higher than $q_I(z;x_0)$, the displacement field update will shrink the target surface to exclude the point.

At step 340, the new estimate $u^{n+1}$ at iteration step n+1 is updated from the previous estimate $u^n$ by $$u^{n+1} = u^n - \Delta t\frac{\partial E(u)}{\partial u} = u^n - \Delta t(F_1 + w_1 F_2 + w_2 F_3) \quad (7)$$

where $\Delta t$ is a step-size parameter that can optionally be set by the user. In a preferred embodiment, the step-size $\Delta t$ for the gradient descent algorithm is automatically chosen by the software program such that the maximum update is equal to the image voxel size at the current resolution level. In an exemplary embodiment, the step-size $\Delta t$ can be computed as follows. First, one can compute $\|F_1+w_1F_2+w_2F_3\|$ at all surface points, where $\|\cdot\|$ denotes the magnitude of the vector inside. Second, one can determine the maximum value of these magnitudes, which can be denoted by $F_{max}$. If one sets h as the image voxel size (if the image voxel size or image spacing is non-isotropic, i.e., non-equal in the three coordinate directions, x-, y-, and z-, then one can take h to be the minimum of the three spacings, $h=\min(h_x,h_y,h_z)$), then $\Delta t$ can be computed as: $\Delta t=h/F_{max}$.

At step 350, the program checks to see if an abort criterion is met. The abort criterion is preferably set as follows. The abort criterion is said to be reached when "convergence" is reached. First, the program calculates the maximum magnitude of the displacement field update ($F_1+w_1F_2+w_2F_3$). Preferably, if the maximum magnitude of the displacement field is less than a small fraction (e.g., 0.01) of the image voxel size, then convergence is said to be reached. If convergence is not reached, the program continues to step 370. If convergence has been reached, then the optimal surface displacement field has been found, and the program continues to step 380.

At step 370 the program checks to see whether the current value of n is greater than the maximum value of n (i.e. the maximum number of iterations that will be performed). The maximum value of n is preferably set such that the program will finish within an allotted period of time, preferably within 2 minutes. If the maximum value of n has been exceeded then the program continues to step 380, even though convergence has not been reached. If the maximum value of n has not been exceeded, then the program continues to step 360.

At step 360, the program increments the value of n by 1, and then returns to step 330 to re-calculate a new surface displacement.

At step 380, the most recently calculated surface displacement field is labelled the optimal surface displacement field, and the program continues to step 390.

Step 390 is the end of the subroutine. Step 390 is not necessarily the end of the entire program. Most likely, the program will repeat the entire process of FIG. 3 for the next object in the reference image, and/or the next resolution level (as described below) and/or the next target image in the series.

IV. Multi-Resolution Embodiment:

In a preferred embodiment, the surface displacement field procedure can be enhanced by performing the procedure at multiple resolutions, starting with a lowest resolution and progressively increasing the resolution. This approach provides better recognition of large deformations or movement of objects.

Figure 4:
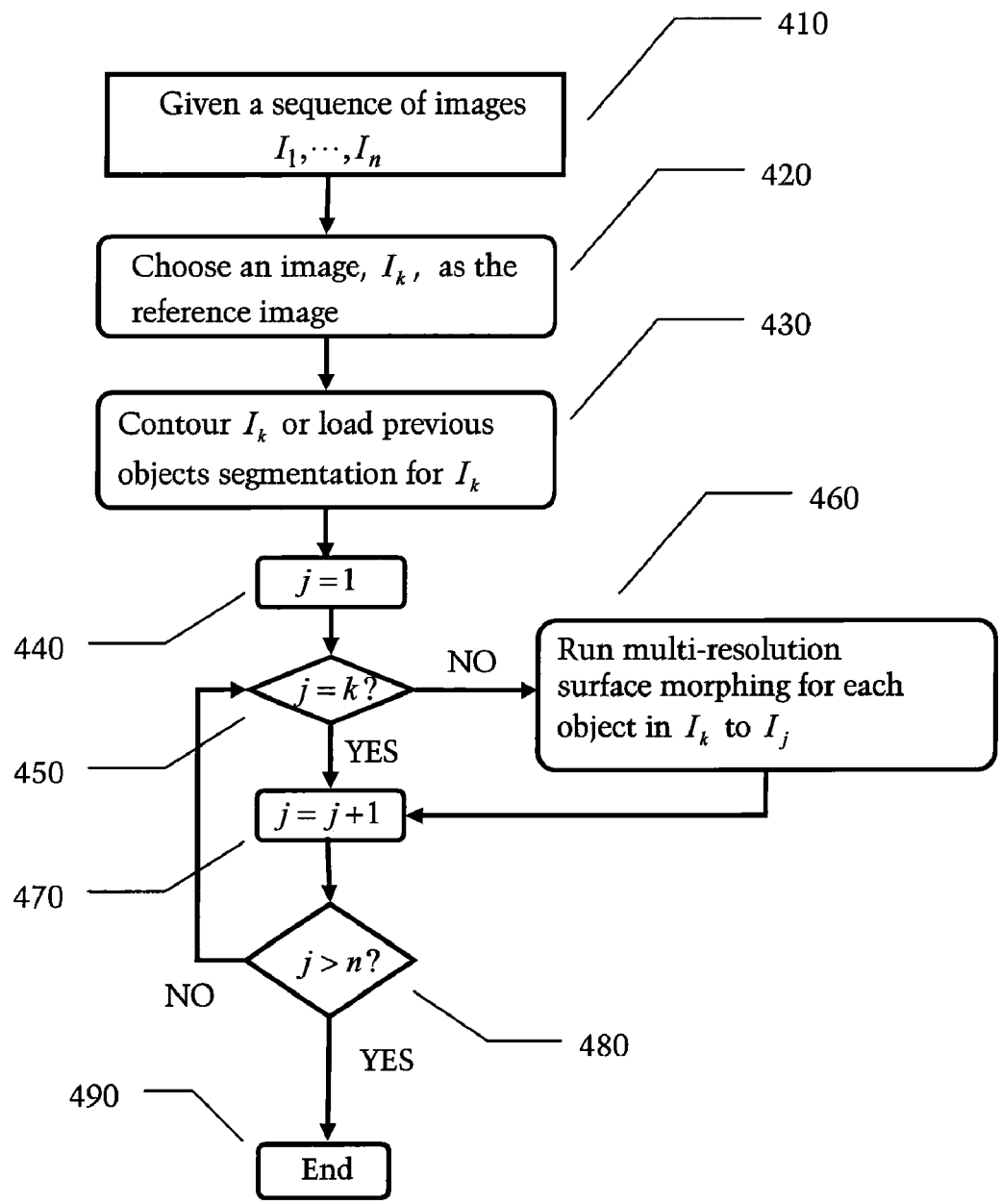
FIG. 4 depicts a flow diagram of the high-level program flow of an exemplary embodiment of the present invention.

FIG. 4 depicts a flow diagram of a multi-resolution surface morphing procedure in accordance with a preferred embodiment of the present invention. At step 410 a sequence of images has been acquired, each image having an assigned sequence number ranging from 1 to n. At step 420, a single image is selected as the reference image. A human being (such as a doctor) preferably performs this step; although this need not be the case. Typically, the reference image is chosen for its contrast quality or other parameters. The reference image need not be the first image in the sequence, chronologically. For example, the end-exhale image is frequently chosen as the reference image because the human body stays relatively still at the end-exhale phase. Thus, the image at this respiration/breathing phase has less motion artifact than the other phases. It should also be understood that a computer program could be used to select the reference image from the 4D sequence of images. For example, the phase information can be included in the image file, in which case the computer program can automatically select which image should be used as the reference image based on the phase information tags within the image files.

At step 430, the reference image, labelled $I_k$, is contoured. Once again, a human being (e.g. a doctor) preferably performs this step manually. However, this need not be the case as any of a number of automated segmentation computer programs are available for this purpose.

At step 440, the program sets a loop variable j equal to 1. At step 450, the program determines whether the current value of loop variable j is equal to k. In other words, the program determines whether the current image is the reference image. If the current image is the reference image, then contouring of the image is not needed (as it has preferably already been contoured), and the program continues to step 470. If the current image is not the reference image, then contouring of the image is desired, and the program continues to step 460. At step 460, the program runs the multi-resolution surface morphing procedure for each contoured object from the reference image using the current image as the target image. Step 460 encompasses the process described in retail in FIG. 5. At step 470, the program increments the value of loop variable j and continues to step 480. At step 480, the program determines whether the current value of j is greater than n. In other words, the program determines whether the previous image was the last image in the sequence. If the previous image was the last image in the sequence, then the program continues to step 490. If the previous image was not the last image in the sequence, then the program continues to step 450. Step 490 is effectively the end of this subroutine. However, step 490 is not necessarily the end of the program. In an alternative embodiment, the program could be configured to use the previously contoured target image as the reference image. At step 460, in this alternative embodiment, the program would run the multi-resolution surface morphing for each object in $I_{j-1}$ to $I_j$.

Figure 5:
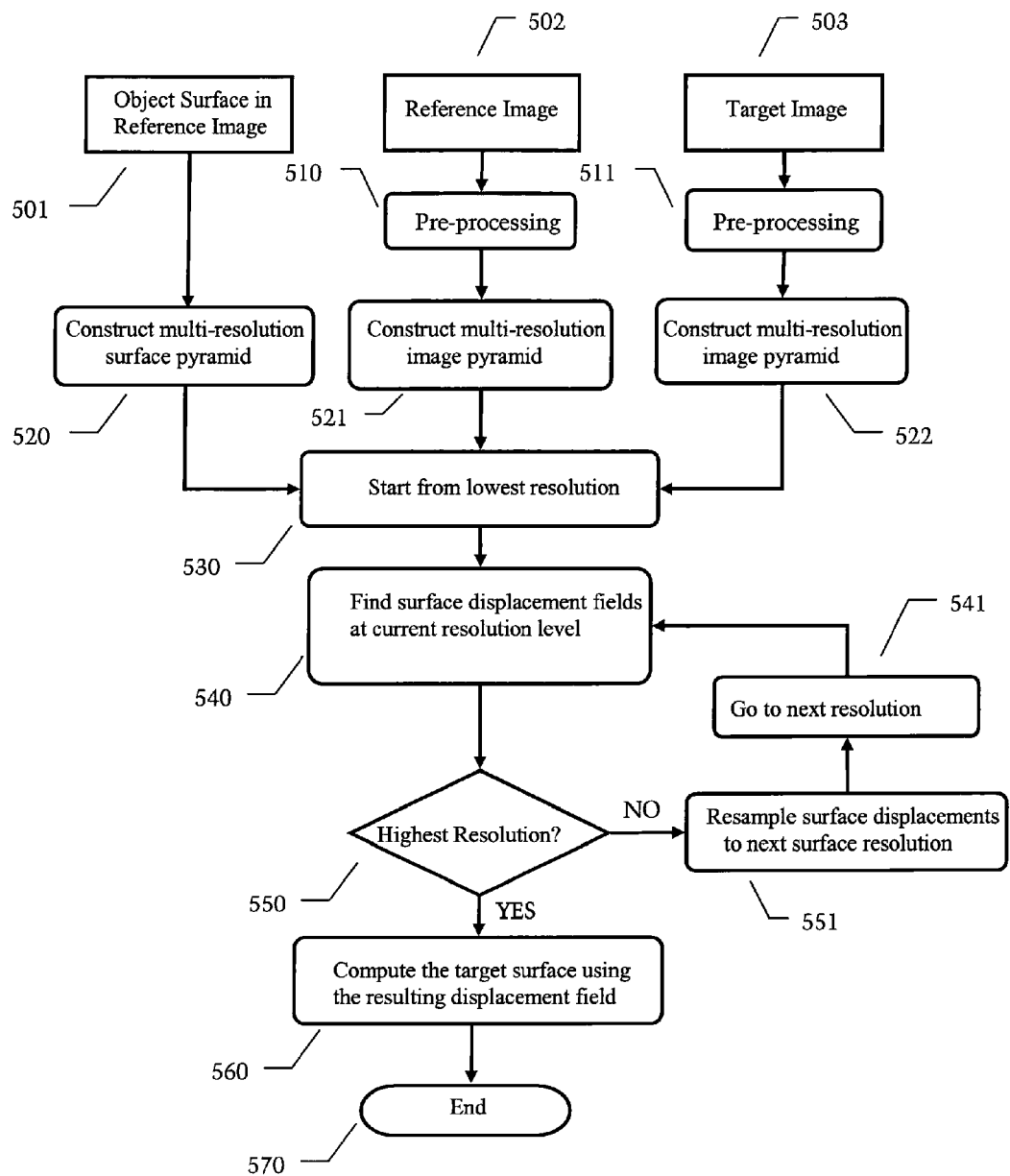
FIG. 5 depicts a flow diagram of a multi-resolution surface morphing procedure in accordance with an exemplary embodiment invention.

FIG. 5 depicts a flow diagram of a multi-resolution surface morphing procedure in accordance with a preferred embodiment of the present invention. Preferably, three resolution levels are used. At step 501, the program loads object surface data from the reference image ($x_0(r,s)$). At step 502, the program loads the reference image. At step 503, the program loads a target image. At step 510, the program optionally performs pre-processing on the reference image. At step 511, the program optionally performs pre-processing on the target image. This pre-processing may include smoothing of the image to remove image noise.

At step 520, the program constructs a multi-resolution surface pyramid for the object surface. A multi-resolution representation of the reference surface can be generated by first converting the original surface mesh into an implicit signed-distance function representation as in typical level set methods. See J. Sethian, "Level set methods and fast marching methods", 2nd ed: Cambridge University Press, 1999, the entire disclosure of which is incorporated by reference herein. Optionally, the signed-distance function volume of the object surface is smoothed by a Gaussian filter. Also at step 520, the signed-distance function volume of the object surface is re-sampled to the resolution of the corresponding reference image at each resolution level, and an isosurface method, such as the marching cubes algorithm, is used to regenerate an explicit surface mesh at that resolution level. See W. E. Lorensen and H. E. Cline, "Marching Cubes: A high resolution 3D surface construction algorithm", Computer Graphics, vol. 21, no. 4, 1987. At step 521, the program constructs a multi-resolution image pyramid for the reference image. At step 522, the program constructs a multi-resolution image pyramid for the target image. Multi-resolution representations of the reference and target images are preferably computed using a Gaussian pyramid approach as described by Adelson. See E. H. Adelson et al., "Pyramid methods in image processing", RCA Engineer, vol. 29, pp. 33-41, 1984, the entire disclosure of which is incorporated by reference herein.

At step 540, the surface displacement field is calculated for the current resolution level. Step 540 encompasses the process described in detail in FIG. 3. After the surface displacement field(s) have been calculated, the program continues to step 550. At step 550, the program determines whether the current resolution is the highest resolution to be used. If the current resolution is not the highest resolution, then the program continues to step 551. If the current resolution is the highest resolution desired, then the program continues to step 560.

At step 551, the program resamples the surface displacements to the next surface resolution and returns to step 541. At step 541, the program changes the current resolution to the next highest resolution and returns to step 540.

At step 560, the program computes the target surface using the previously computed surface displacement field(s) and continues to step 570. Step 570 is the end of this subroutine.

In summary, the surface displacement field is calculated at the coarsest resolution by solving the energy minimization equation (1) for that resolution. The optimal surface displacement field computed for the coarsest resolution is then interpolated to the next highest resolution and used as the initialization for the gradient descent minimization at the finer level. The process is repeated until convergence is achieved at the finest level. The surface displacement field thereby computed is then used to generate the contour data for the target image.

FIG. 6 shows a pseudo-code implementation for the multi-resolution morphing active surface model algorithm. The convergence criterion is defined at each resolution level by checking the maximum magnitude of the displacement field update ($F_1+w_1F_2+w_2F_3$). Convergence is assumed if the maximum magnitude is less than a small fraction (e.g., 0.01) of the image voxel size at the current resolution.

When applying the multi-resolution algorithm, the surface displacements at the bottom (coarsest) level are usually initialized to be all zeros. An alternative initialization approach is possible when applying the algorithm for the automatic re-contouring of a 4D image sequence. In this case, a more efficient way to apply the proposed method is to first process the phase next to the reference image phase; the final result can then be used as initialization for the processing of the next adjacent phase. This initialization simply involves a down-sampling of the surface displacement field at the fine surface resolution to the coarsest level surface mesh.

V. Results:

In this section the results of practicing various embodiments of the invention will be explained with reference to the drawings.

Figure 7A:
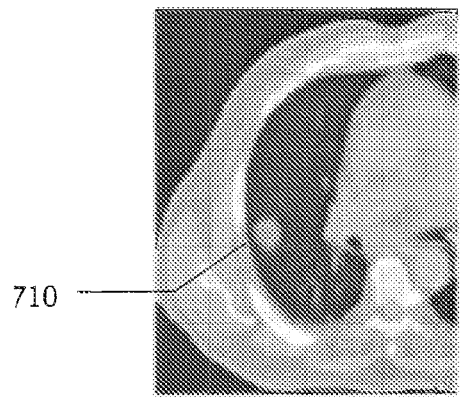
FIGS. 7(a)-7(d) depict the results of the automatic re-contouring of a 4D computed tomography (CT) dataset according to an exemplary embodiment, where a tumor is the object of interest.
Figure 7B:
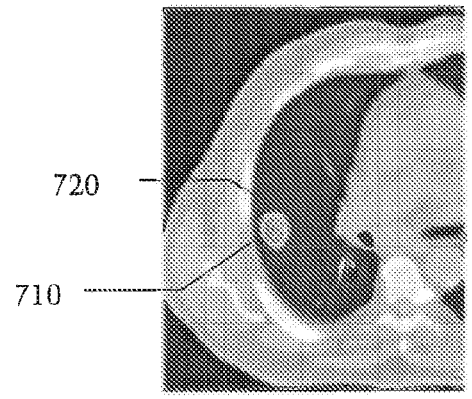
Figure 7C:
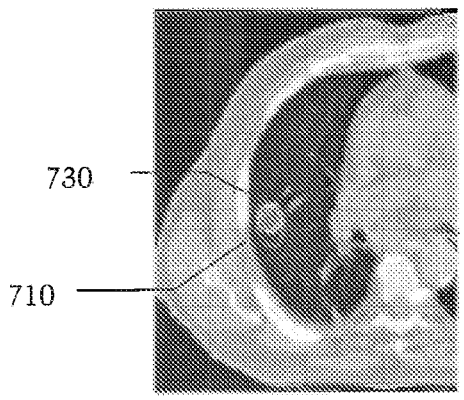
Figure 7D:
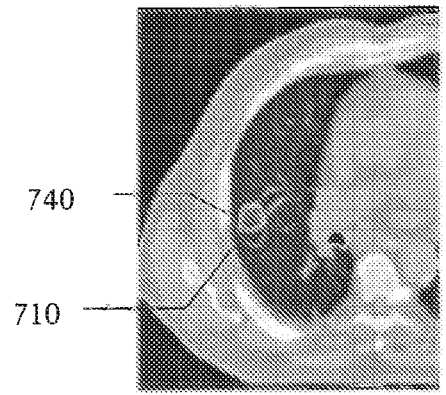

FIGS. 7(a)-7(d) depict the results of the automatic re-contouring of a 4D CT dataset according to an exemplary embodiment, where a tumor is the object of interest. FIG. 7(a) shows the reference image with the manual tumor segmentation shown as curve 710. FIGS. 7(b)-7(d) show target images that include contours generated by an exemplary embodiment of the present invention. Curve 710 is also shown in FIGS. 7(b)-7(d) for reference and to show the original location of the tumor. In FIG. 7(b), curve 720 represents a contour generated by an exemplary embodiment of the present invention. In FIG. 7(c), curve 730 represents a contour generated by an exemplary embodiment of the present invention. In FIG. 7(d), curve 740 represents a contour generated by an exemplary embodiment of the present invention. As is clear from visual inspection of these images, the curves 720, 730, and 740 generated by an embodiment of the present invention accurately track the motion of the tumor as the tumor moves further from its original location shown by curve 710.

Figure 8A:
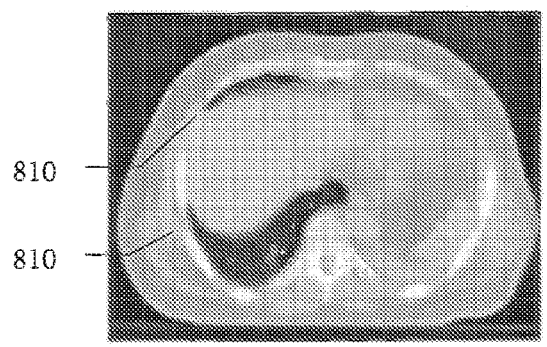
FIGS. 8(a)-8(f) depict the results of the automatic re-contouring of a 4D CT dataset according to an exemplary embodiment, where the lung is the object of interest.
Figure 8B:
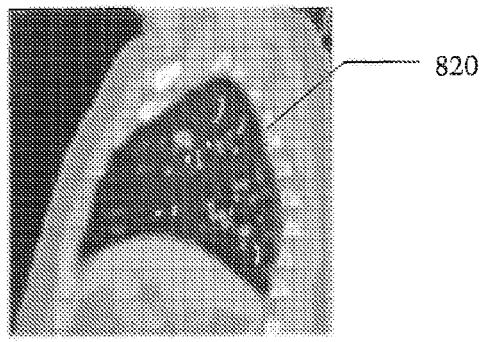
Figure 8C:
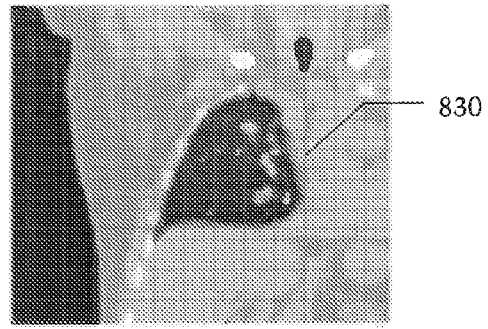
Figure 8D:
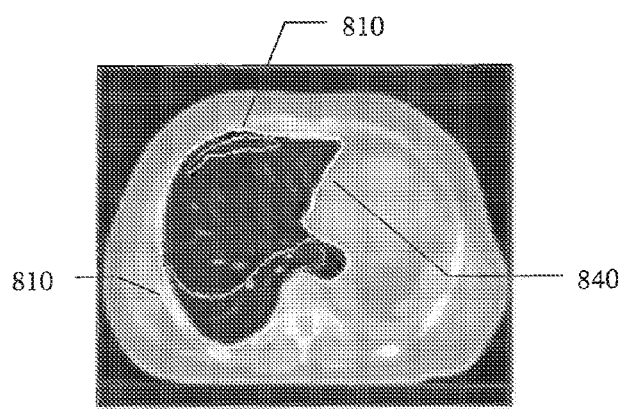
Figure 8E:
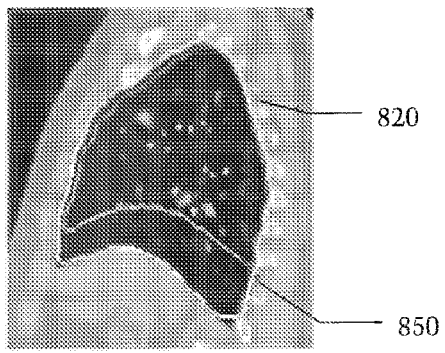
Figure 8F:
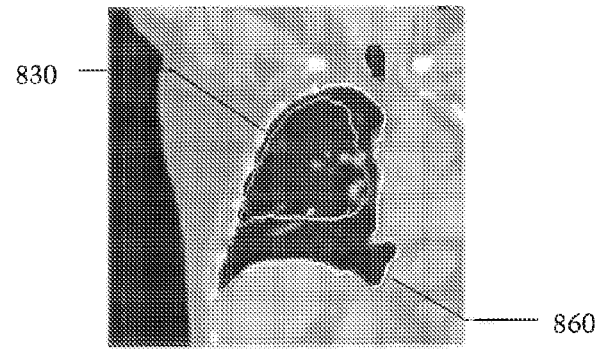

FIGS. 8(a)-8(f) depict the results of the automatic re-contouring of a 4D CT dataset according to an exemplary embodiment, where the lung is the object of interest. FIGS. 8(a)-(c) show three orthogonal views of the 3D reference image. Manual contouring of the lung is shown in each image. In FIG. 8(a), two manual contours are shown as curves 810. In FIG. 8(b), a manual contour is shown as curve 820. In FIG. 8(c), a manual contour is shown as curve 830. FIGS. 8(d)-(f) show the results of an exemplary embodiment of the present invention. In FIG. 8(d), a contour generated by an exemplary embodiment of the present invention is represented by curve 840. Original manual contour 810 is also shown for reference. In FIG. 8(e), a contour generated by an exemplary embodiment of the present invention is shown as curve 850. Original manual contour 820 is also shown for reference. In FIG. 8(f), a contour generated by an exemplary embodiment of the present invention is shown as curve 860. Original manual contour 830 is also shown for reference. As is clear from visual inspection of these images, the contours generated by an exemplary embodiment of the present invention accurately track the deformation of the lung.

Figure 9A:
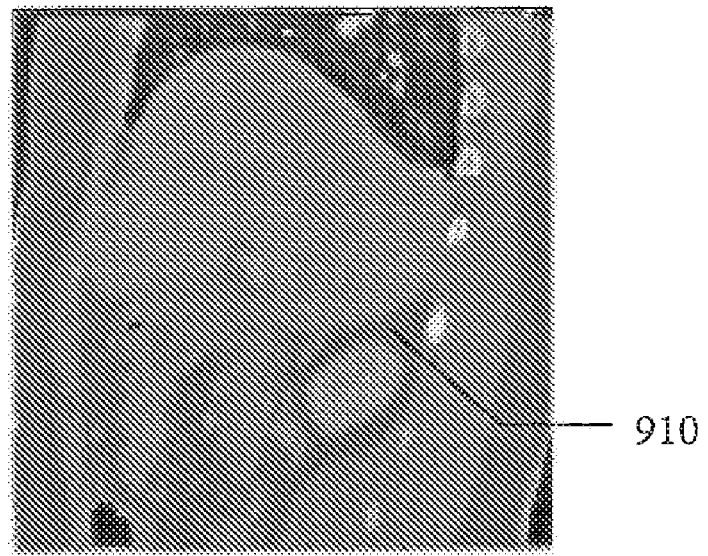
FIGS. 9(a)-9(f) depict the results of three different approaches to the automatic re-contouring of a 4D respiration correlated computed tomography (RCCT) dataset where the liver is the object of interest.
Figure 9B:
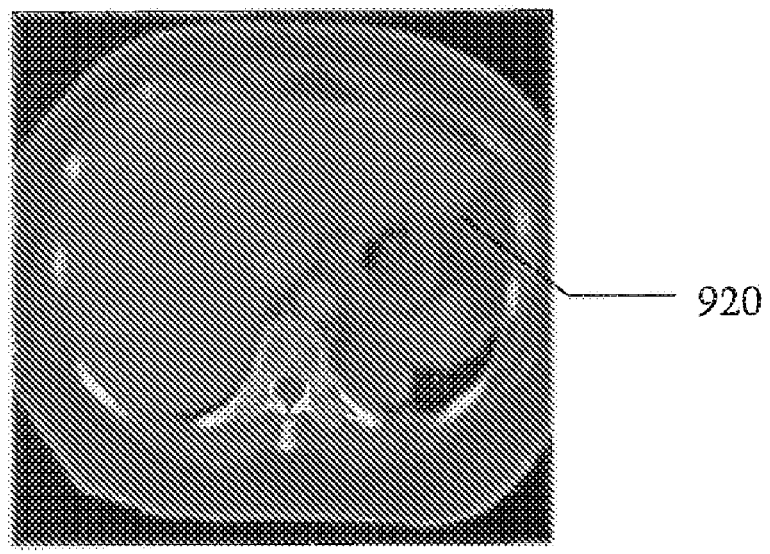
Figure 9C:
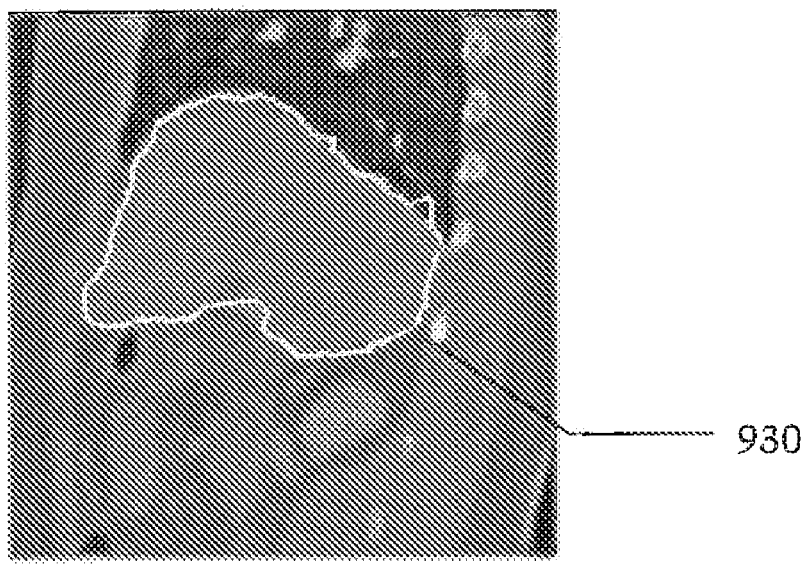
Figure 9D:
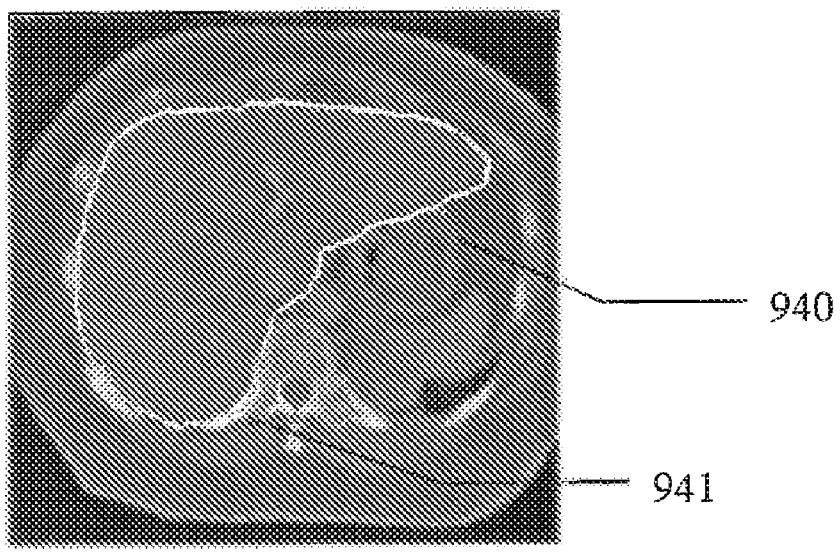
Figure 9E:
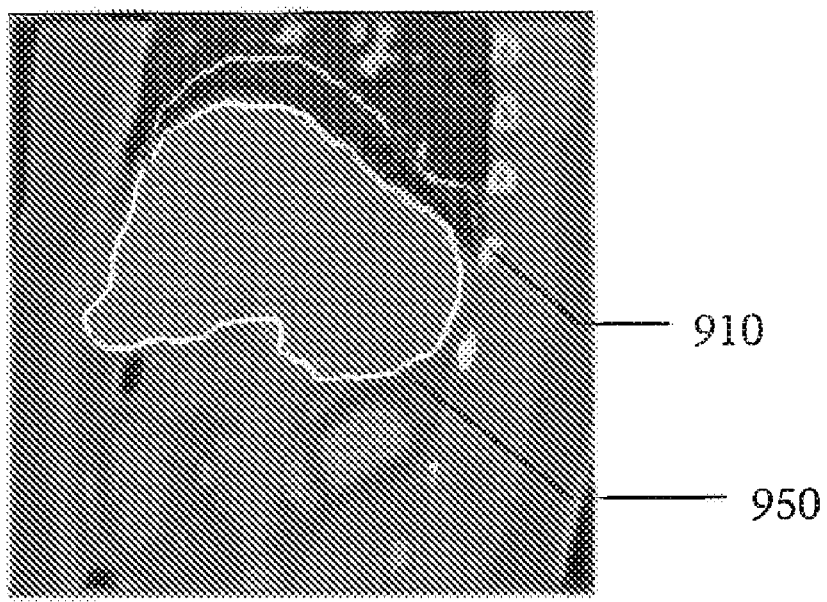
Figure 9F:
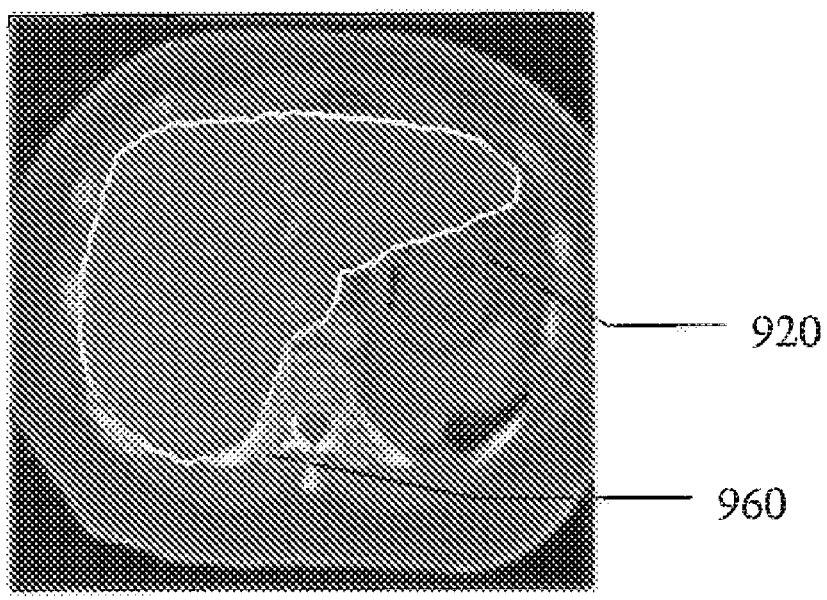

FIGS. 9(a)-9(f) depict the results of three different approaches to the automatic re-contouring of a 4D respiration correlated computed tomography (RCCT) dataset where the liver is the object of interest. FIG. 9(a) shows the reference image in sagittal view with curve 910 representing the manual contour of the liver. FIG. 9(b) shows the transverse view with curve 920 representing the manual contour of the liver, FIG. 9(c) shows the result of another approach, namely a volumetric registration used with a traditional isotropic regularization of the deformation field. Curve 930 represents the contour generated by this method. As shown in FIG. 9(c), the result of this volumetric approach suffers from a large error: part of the liver surface is "pulled back" by the neighboring structure, as can be seen at the top-right of curve 930. FIG. 9(d) shows the result of an exemplary embodiment of the present invention wherein the segmentation term is omitted ($w_2$=00. In FIG. 9(d), the deformed surface leaks through the adjacent bone boundary and stays in the middle of the bone area which has a similar intensity as that of the liver, as indicated by reference number 941. FIG. 9(e) shows a target image in sagittal view with the results of an exemplary embodiment of the present invention shown as curve 950. Original manual contour 910 is shown for reference. FIG. 9(f) shows a target image in transverse view with the results of an exemplary embodiment of the present invention shown as curve 960. Original manual contour 920 is shown for reference. As can be seen from FIGS. 9(e) and 9(f), the contours generated by an exemplary embodiment of the present invention accurately track the change in shape and/or location of the liver.

It should be noted that the embodiments described above can be employed to contour multiple objects of interest within a single 4D image sequence. With respect to the multi-resolution implementation of FIG. 5, preferably the software loops through the multiple objects before looping through the multiple resolutions. It should also be noted that steps 502, 510, and 521 need only be performed once for each reference image, and steps 503, 511, and 522 need only be performed once for each target image, independent of the number of objects of interest, because the resulting multi-resolution representations can be stored in computer memory.

While the present invention has been described above in relation to its preferred embodiments including the preferred equations discussed herein, various modifications may be made thereto that still fall within the invention's scope. Such modifications to the invention will be recognizable upon review of the teachings herein. Accordingly, the full scope of the present invention is to be defined solely by the appended claims and their legal equivalents.

What is claimed is:

1. A computer-implemented method for processing image data, the method comprising:

computing, by a processor, a surface displacement field based at least in part on a first, second and third plurality of data points, the first plurality of data points being representative of at least a portion of a reference image, the reference image depicting an object of interest therein, the second plurality of data points being representative of a contour within the reference image, the contour corresponding to the object of interest, the third plurality of data points being representative of at least a portion of a target image, the target image depicting the object of interest therein, the surface displacement field defining a map from the second plurality of data points to a fourth plurality of data points, the fourth plurality of data points representative of a contour within the target image, the target image contour corresponding to the object of interest.

2. The method of claim 1 further comprising:

loading the first, second and third plurality of data points into a computer memory; and the processor performing the computing step on the loaded first, second, and third plurality of data points.

3. The method of claim 2 further comprising:
the processor computing the fourth plurality of data points based at least in part on the second plurality of data points and the surface displacement field.

4. The method of claim 3 wherein the first plurality of data points comprise less than all of the data points of the reference image and are limited to (1) a plurality of data points in the reference image that are located inside the reference image contour, and (2) a plurality of data points outside the reference image contour that are within a specified neighborhood of the reference image object of interest.

5. The method of claim 3 wherein the surface displacement field computing step further comprises:
the processor iteratively solving an energy minimization function based at least in part on the first, second and third plurality of data points.

6. The method of claim 2 wherein the computing step comprises:
the processor computing the surface displacement field based at least in part on a registration term and a regularization term.

7. The method of claim 6 wherein the surface displacement field computing step further comprises:
the processor computing the surface displacement field based at least in part on a segmentation term.

8. The method of claim 7 further comprising:
the processor defining a weight value for the segmentation term, the weight value defining a relative weight of the segmentation term within the surface displacement field computing step.

9. The method of claim 7 wherein the surface displacement field computing step comprises:
the processor calculating the segmentation term based at least in part on a histogram matching-based segmentation criterion.

10. The method of claim 6 wherein the surface displacement field computing step further comprises:
the processor iteratively computing the surface displacement field based at least in part on a gradient descent approach with respect to the registration term and the regularization term.

11. The method of claim 6 wherein each data point has an associated intensity value, and wherein the surface displacement computing step comprises the processor calculating the registration term based at least in part on a plurality of intensity differences between the first plurality of data points and the third plurality of data points.

12. The method of claim 6 further comprising:
the processor defining a weight value for the regularization term, the weight value defining a relative weight of the regularization term within the surface displacement field computing step.

13. The method of claim 6 further comprising:
the processor computing the fourth plurality of data points based at least in part on the second plurality of data points and the surface displacement field.

14. The method of claim 13 wherein the object of interest comprises an anatomical structure within a human body, wherein the reference image and the target image are part of a 4D image sequence, and wherein the method further comprises performing the computing step for a plurality of additional target images within the 4D image sequence.

15. The method of claim 13 wherein the surface displacement field computing step further comprises:
the processor iteratively solving an energy minimization function based at least in part on the first, second and third plurality of data points, the energy minimization function comprising the registration term and the regularization term.

16. The method of claim 15 wherein the iteratively solving step comprises iteratively solving the energy minimization function based on a gradient descent approach.

17. The method of claim 2 wherein the surface displacement field comprises a three-dimensional vector field.

18. The method of claim 2 wherein the first, second and third plurality of data points comprise three-dimensional data points.

19. The method of claim 2 wherein the object of interest comprises an anatomical structure within a human body, wherein the reference image and the target image are part of a 4D image sequence, and wherein the method further comprises performing the computing step for a plurality of additional target images within the 4D image sequence.

20. The method of claim 19 further comprising:
the processor computing the fourth plurality of data points based at least in part on the second plurality of data points and the surface displacement field.

21. The method of claim 2 further comprising:
selecting an image from a plurality of images, the selected image comprising the reference image.

22. The method of claim 2 further comprising:
contouring the reference image to generate the second plurality of data points.

23. The method of claim 22 wherein the contouring step comprises manually contouring the reference image to generate the second plurality of data points.

24. The method of claim 2 wherein the reference image and the target image comprise computed tomography images.

25. The method of claim 2 wherein the surface displacement field computing step comprises:
the processor iteratively computing the surface displacement field for a plurality of increasing resolutions with respect to the reference image and the target image.

26. The method of claim 25 further comprising:
the processor computing the fourth plurality of data points based at least in part on the second plurality of data points and the surface displacement field.

27. The method of claim 26 wherein the object of interest comprises an anatomical structure within a human body, wherein the reference image and the target image are part of a 4D image sequence, and wherein the method further comprises performing the computing step for a plurality of additional target images within the 4D image sequence.

28. An apparatus for processing image data, the apparatus comprising:
a processor configured to compute a surface displacement field based at least in part on a first, second and third plurality of data points, the first plurality of data points being representative of at least a portion of a reference image, the reference image depicting an object of interest therein, the second plurality of data points being representative of a contour within the reference image, the contour corresponding to the object of interest, the third plurality of data points being representative of at least a portion of a target image, the target image depicting the object of interest therein, the surface displacement field defining a map from the second plurality of data points to a fourth plurality of data points, the fourth plurality of data points representative of a contour within the target image, the target image contour corresponding to the object of interest.

29. The apparatus of claim 28 wherein the processor is further configured to compute the fourth plurality of data points based at least in part on the second plurality of data points and the surface displacement field.

30. The apparatus of claim 29 wherein the first plurality of data points comprise less than all of the data points of the reference image and are limited to (1) a plurality of data points in the reference image that are located inside the reference image contour, and (2) a plurality of data points outside the reference image contour that are within a specified neighborhood of the reference image object of interest.

31. The apparatus of claim 29 wherein the processor is further configured to compute the surface displacement field by iteratively solving an energy minimization function based at least in part on the first, second and third plurality of data points.

32. The apparatus of claim 28 wherein the processor is further configured to compute the surface displacement field based at least in part on a registration term and a regularization term.

33. The apparatus of claim 32 wherein the processor is further configured to compute the surface displacement field based at least in part on a segmentation term.

34. The apparatus of claim 33 wherein the processor is further configured to compute the surface displacement field based on a weight value for the segmentation term, the weight value defining a relative weight of the segmentation term within the surface displacement field computation.

35. The apparatus of claim 33 wherein the processor is further configured to compute the segmentation term based at least in part on a histogram matching-based segmentation criterion.

36. The apparatus of claim 32 wherein the processor is further configured to iteratively compute the surface displacement field based at least in part on a gradient descent approach with respect to the registration term and the regularization term.

37. The apparatus of claim 36 wherein the processor is further configured to compute the fourth plurality of data points based at least in part on the second plurality of data points and the surface displacement field.

38. The apparatus of claim 32 wherein each data point has an associated intensity value, and wherein the processor is further configured to compute the registration term based at least in part on a plurality of intensity differences between the first plurality of data points and the third plurality of data points.

39. The apparatus of claim 32 wherein the processor is further configured to compute the surface displacement field based on a weight value for the regularization term, the weight value defining a relative weight of the regularization term within the surface displacement field computation.

40. The apparatus of claim 32 wherein the processor is further configured to compute the fourth plurality of data points based at least in part on the second plurality of data points and the surface displacement field.

41. The apparatus of claim 40 wherein the processor is further configured to compute the surface displacement field by iteratively solving an energy minimization function based at least in part on the first, second and third plurality of data points, the energy minimization function comprising the registration term and the regularization term.

42. The apparatus of claim 41 wherein the processor is further configured to iteratively solve the energy minimization function based on a gradient descent approach.

43. The apparatus of claim 28 wherein the object of interest comprises an anatomical structure within a human body, wherein the reference image and the target image are part of a 4D image sequence, and wherein the processor is further configured to perform the surface displacement field computation for a plurality of additional target images within the 4D image sequence.

44. The apparatus of claim 43 wherein the processor is further configured to compute the fourth plurality of data points based at least in part on the second plurality of data points and the surface displacement field.

45. The apparatus of claim 28 wherein the processor is further configured to compute the surface displacement field by iteratively computing the surface displacement field for a plurality of increasing resolutions with respect to the reference image and the target image.

46. The apparatus of claim 45 wherein the processor is further configured to compute the fourth plurality of data points based at least in part on the second plurality of data points and the surface displacement field.

47. The apparatus of claim 28 further comprising a memory in cooperation with the processor, the memory configured to store the first plurality of data points, the second plurality of data points, and the third plurality of data points.

48. A computer-readable storage medium for processing image data, the computer-readable storage medium comprising:
a plurality of computer-executable instructions for computing a surface displacement field based at least in part on a first, second and third plurality of data points, the first plurality of data points being representative of at least a portion of a reference image, the reference image depicting an object of interest therein, the second plurality of data points being representative of a contour within the reference image, the contour corresponding to the object of interest, the third plurality of data points being representative of at least a portion of a target image, the target image depicting the object of interest therein, the surface displacement field defining a map from the second plurality of data points to a fourth plurality of data points, the fourth plurality of data points representative of a contour within the target image, the target image contour corresponding to the object of interest; and
wherein the instructions are resident on the computer-readable storage medium.

49. The computer-readable storage medium of claim 48 wherein the instructions further comprise computer-executable instructions for computing the fourth plurality of data points based at least in part on the second plurality of data points and the surface displacement field.

50. The computer-readable storage medium of claim 49 wherein the first plurality of data points comprise less than all of the data points of the reference image and are limited to (1) a plurality of data points in the reference image that are located inside the reference image contour, and (2) a plurality of data points outside the reference image contour that are within a specified neighborhood of the reference image object of interest.

51. The computer-readable storage medium of claim 49 wherein the instructions further comprise computer-executable instructions for iteratively solving an energy minimization function based at least in part on the first, second and third plurality of data points to compute the surface displacement field.

52. The computer-readable storage medium of claim 48 wherein the instructions further comprise computer-executable instructions for computing the surface displacement field based at least in part on a registration term and a regularization term.

53. The computer-readable storage medium of claim 52 wherein the instructions further comprise computer-executable instructions for computing the surface displacement field based at least in part on a segmentation term.

54. The computer-readable storage medium of claim 53 wherein the instructions further comprise computer-executable instructions for defining a weight value for the segmentation term in response to user input, the weight value defining a relative weight of the segmentation term within the surface displacement field computing step.

55. The computer-readable storage medium of claim 53 wherein the instructions further comprise computer-executable instructions for calculating the segmentation term based at least in part on a histogram matching-based segmentation criterion.

56. The computer-readable storage medium of claim 53 wherein the instructions further comprise computer-executable instructions for computing the fourth plurality of data points based at least in part on the second plurality of data points and the surface displacement field.

57. The computer-readable storage medium of claim 52 wherein the instructions further comprise computer-executable instructions for iteratively computing the surface displacement field based at least in part on a gradient descent approach with respect to the registration term and the regularization term.

58. The computer-readable storage medium of claim 57 wherein the instructions further comprise computer-executable instructions for computing the fourth plurality of data points based at least in part on the second plurality of data points and the surface displacement field.

59. The computer-readable storage medium of claim 52 wherein each data point has an associated intensity value, and wherein the instructions further comprise computer-executable instructions for calculating the registration term based at least in part on a plurality of intensity differences between the first plurality of data points and the third plurality of data points.

60. The computer-readable storage medium of claim 59 wherein the instructions further comprise computer-executable instructions for computing the fourth plurality of data points based at least in part on the second plurality of data points and the surface displacement field.

61. The computer-readable storage medium of claim 52 wherein the instructions further comprise computer-executable instructions for defining a weight value for the regularization term in response to user input, the weight value defining a relative weight of the regularization term within the surface displacement field computing step.

62. The computer-readable storage medium of claim 61 wherein the instructions further comprise computer-executable instructions for computing the fourth plurality of data points based at least in part on the second plurality of data points and the surface displacement field.

63. The computer-readable storage medium of claim 52 wherein the instructions further comprise computer-executable instructions for computing the fourth plurality of data points based at least in part on the second plurality of data points and the surface displacement field.

64. The computer-readable storage medium of claim 63 wherein the object of interest comprises an anatomical structure within a human body, wherein the reference image and the target image are part of a 4D image sequence, and wherein the instructions further comprise computer-executable instructions for performing the surface displacement field computation for a plurality of additional target images within the 4D image sequence.

65. The computer-readable storage medium of claim 63 wherein the instructions further comprise computer-executable instructions for iteratively solving an energy minimization function based at least in part on the first, second and third plurality of data points to compute the surface displacement field, the energy minimization function comprising the registration term and the regularization term.

66. The computer-readable storage medium of claim 65 wherein the instructions further comprise computer-executable instructions for iteratively solving the energy minimization function based on a gradient descent approach to compute the surface displacement field.

67. The computer-readable storage medium of claim 48 wherein the object of interest comprises an anatomical structure within a human body, wherein the reference image and the target image are part of a 4D image sequence, and wherein the instructions further comprise computer-executable instructions for performing the surface displacement field computation for a plurality of additional target images within the 4D image sequence.

68. The computer-readable storage medium of claim 48 wherein the instructions further comprise computer-executable instructions for selecting an image from a plurality of images, the selected image comprising the reference image.

69. The computer-readable storage medium of claim 48 wherein the instructions further comprise computer-executable instructions for iteratively computing the surface displacement field for a plurality of increasing resolutions with respect to the reference image and the target image.

70. The computer-readable storage medium of claim 69 wherein the instructions further comprise computer-executable instructions for computing the fourth plurality of data points based at least in part on the second plurality of data points and the surface displacement field.

* * * * *